United States Patent
Barbee et al.

(10) Patent No.: US 7,502,658 B1
(45) Date of Patent: Mar. 10, 2009

(54) METHODS OF FABRICATING OPTIMIZATION INVOLVING PROCESS SEQUENCE ANALYSIS

(75) Inventors: Steven G. Barbee, Dover Plains, NY (US); Jeong W. Nam, Poughquag, NY (US); Viorel Ontalus, Danbury, CT (US); Yuusheng Song, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/033,502

(22) Filed: Feb. 19, 2008

(51) Int. Cl.
*G06F 19/00* (2006.01)
(52) U.S. Cl. ............... 700/109; 700/51; 702/82; 702/84
(58) Field of Classification Search ........... 700/51, 700/95, 97, 99, 108, 109, 117, 121; 702/81, 702/82, 84, 179, 181, 182
See application file for complete search history.

(56) References Cited

U.S. PATENT DOCUMENTS 5,225,998 A * 7/1993 Singhal ............... 702/84
6,999,897 B2   2/2006 Tai et al.
7,085,612 B2 * 8/2006 Liu et al. ............... 700/91
2005/0182596 A1 * 8/2005 Chang ............... 702/182
2007/0021855 A1 * 1/2007 Ono et al. ............... 700/110
2008/0033589 A1 * 2/2008 Ontalus et al. ............... 700/109

OTHER PUBLICATIONS

"Statistical Significance". Wikipedia. Printed Jul. 24, 2008.*
"Kruskal-Wallace one-way analyis of variance". Wikipedia. Printed Jul. 24, 2008.*

* cited by examiner

*Primary Examiner*—Ryan A Jarrett
(74) *Attorney, Agent, or Firm*—Cantor Coburn LLP; Todd M. C. Li

(57) ABSTRACT

An exemplary method for performing fabrication sequence analysis, the method comprising, defining a process group, wherein a process group includes fabrication processes in a fabrication sequence, determining fabrication process paths in the process group to define independent variables, wherein a process path is a plurality of fabrication equipment used to fabricate a particular semiconductor device in the fabrication sequence, receiving a dependent variable for the fabrication sequence, performing analysis of variance to calculate a p-value for the process group, determining whether the p-value is lower than a threshold value, identifying a poor process path responsive to determining that the p-value is lower than a threshold value, and outputting the identified poor process path.

2 Claims, 2 Drawing Sheets

METHODS OF FABRICATING OPTIMIZATION INVOLVING PROCESS SEQUENCE ANALYSIS

BACKGROUND OF THE INVENTION

1. Field of the Invention

This invention relates generally to semiconductor fabrication processes, and specifically to analyzing the performance of particular tool and chamber sequences in a semiconductor fabrication process.

2. Description of Background

Processes for fabricating semiconductors often include placing semiconductor wafers in chambers and using tooling processes. As the wafers are fabricated, they are placed in different sets of chambers that each perform a function in the fabrication process. For example, one set of chambers may be used for depositing material on production run of wafers and another set of chambers may be used to etch portions of the material from the wafers. Though each of the chambers in a set may be calibrated to perform an operation within a given range of tolerances, each chamber may still have a variance in the output from the process that is within the tolerance. The variances may have an additive effect on the output of the production run of wafers. For example, if a wafer is run through a chamber that deposits material on the wafer at a lower end of a deposition tolerance, the wafer will have a thinner layer of material. If the wafer is then run through a chamber that etches material at a higher end of an etching tolerance, the resultant layer of material may be outside of the specifications for the finished wafer.

SUMMARY OF THE INVENTION

The shortcomings of the prior art are overcome and additional advantages are achieved through an exemplary method for performing fabrication sequence analysis, the method comprising, defining a process group, wherein a process group includes fabrication processes in a fabrication sequence, determining fabrication process paths in the process group to define independent variables, wherein a process path is a plurality of fabrication equipment used to fabricate a particular semiconductor device in the fabrication sequence, receiving a dependent variable for the fabrication sequence, performing analysis of variance to calculate a p-value for the process group, determining whether the p-value is lower than a threshold value, identifying a poor process path responsive to determining that the p-value is lower than a threshold value, and outputting the identified poor process path.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Methods involving fabrication sequence analysis are provided. Several exemplary embodiments are described.

Semiconductor fabrication often includes subjecting semiconductor wafers to a variety of fabrication processes. A sequence of processes is used to produce semiconductors. The processes may include, for example, using tooling to fabricate a semiconductor, and processing a wafer in different chambers that deposit material on the wafer and etch material from a wafer. A production run of semiconductors may include thousands of wafers that are processed through tooling and chambers.

Figure 1:
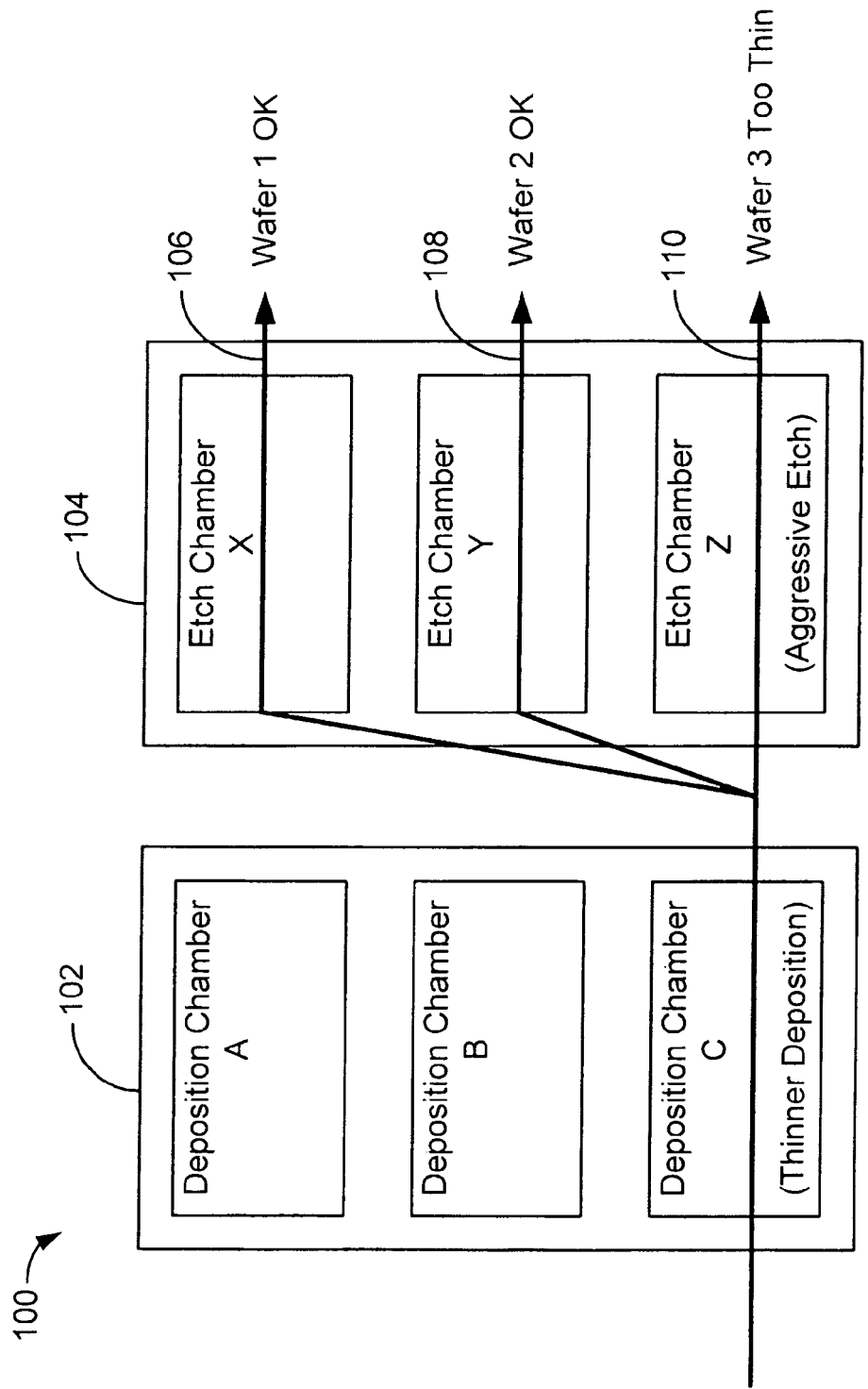
FIG. 1 illustrates a block diagram of an example of a fabrication sequence.

FIG. 1 illustrates an exemplary fabrication sequence 100. The fabrication sequence 100 includes a deposition fabrication process 102 and an etch fabrication process 104. The deposition fabrication process 102 includes three deposition chambers A, B, and C. The etch fabrication process 104 includes three etch chambers X, Y, and Z. Process paths 106, 108, and 110 represent paths that wafers 1, 2, and 3 have followed respectively in the fabrication sequence 100.

In this regard, to fabricate a semiconductor, a wafer has a layer of material, such as, for example, nitride deposited on the wafer in one of the deposition chambers in the deposition fabrication process 102. A wafer then has portions of the deposited material removed in one of the etch chambers in the etch fabrication process 104. Though all of the wafers follow the similar sequence of undergoing the deposition fabrication process 102 and then undergoing the etch fabrication process 104, different wafers may follow different process paths through the fabrication sequence 100 because each of the fabrication processes includes a number of different chambers that each perform a similar process. In the illustrated example, wafer 1 follows a process path 106 that runs through the deposition chamber C and the etch chamber X. Wafer 2 follows the process path 108 and runs through the deposition chamber C and the etch chamber Y. While wafer 3 has a process path 110 that runs through the deposition chamber C and the etch chamber Z.

The tooling and chambers that are used are calibrated to function within specified tolerances. Though the tolerances are small, each of the chambers and tools in a particular fabrication process may have small differences in the output from the process that the chamber and tool performs. These minute differences may have a cumulative result in the semiconductors that undergo the fabrication sequence. Referring to the example in FIG. 1, the deposition chamber C deposits a nitride layer that is thinner than the other chambers in the deposition fabrication process 102. The etch chamber Z etches more nitride material (a more aggressive etch) than the etch chambers X and Y in the etch fabrication process 104. Thus, wafer 3, which follows the process path 110, has a resultant nitride layer that is too thin, and out of the specifications for the semiconductor. Since a fabrication sequence may include a large number of fabrication processes each having a number of different tools and chambers, there may be thousands of different process paths that wafers may follow through the fabrication sequence. A method that identifies poor process paths that should be avoided in a fabrication sequence is desired.

Figure 2:
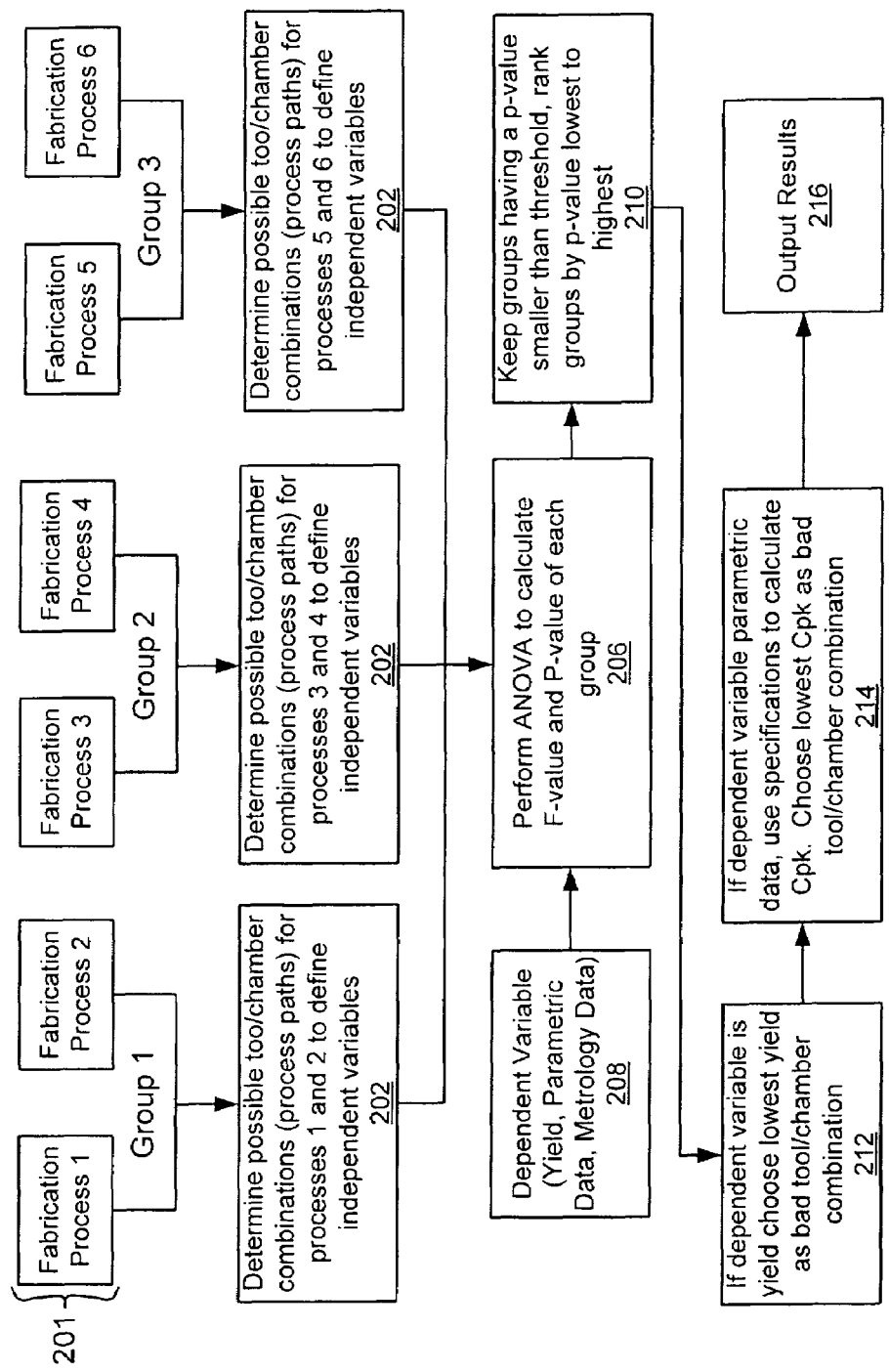
FIG. 2 illustrates a block diagram of an exemplary method for performing chamber and tooling sequence analysis.

FIG. 2 illustrates a block diagram of an exemplary method for performing chamber and tooling sequence analysis. Fabrication processes 201 included fabrication processes 1 through 6 that make up all, or a portion of a semiconductor fabrication sequence. The fabrication processes 201 may be similar to the exemplary fabrication processes 102 and 104 (in FIG. 1). Each fabrication process 201 may include one or more chambers and tools that perform similar actions in the fabrication process. The fabrication processes 201 are grouped into groups 1, 2, and 3. In the illustrated embodiment, the groups include two fabrication processes 201, however a group may include any number of fabrication processes 201. In blocks 202, all of the possible tool/chamber combinations (process paths) in each group are determined to define independent variables. Once the independent variables are defined, a dependent variable is received in block 208. Dependent variables may include, for example, yield, parametric data, and metrology data. The dependent variables are measured after a wafer has completed all or portions of the fabrication sequence.

Analysis of variance (ANOVA) is performed in block 206, with the defined independent variables and dependent variables. Using ANOVA, p-values are calculated that will be used to identify poor process paths. The ANOVA method used in the illustrated embodiments is one-way ANOVA. One-way ANOVA is a statistical method used to compare the means of three or more populations (groups) at the same time. Other types of ANOVA may be used that may, for example, allow the analysis of less than three groups.

One-way ANOVA compares group means by inspecting comparisons of variance estimates. If the variance estimates are compared in a ratio, the ratio should be 1 if the group means are equal (assuming random sample errors are disregarded). The ratio of the variance estimates may be distributed along an F curve. An F-value is defined as a mean square between groups divided by a mean square within groups, and is derived from the variance estimates. A large F-value indicates relatively more difference between groups than within groups.

Once the F-value is determined, P-values for the groups may be calculated. To calculate the P-value, a function F(1-1, n-1) is compared to a distribution of the dependent variables. The 1-1 is the degree of freedom in a numerator of the P-value (the number of process paths-1). The n-1 is the degree of freedom in the denominator of the P-value (the rest of the distribution of F) where n is the number of wafers undergoing the fabrication sequence. In the illustrated method of FIG. 2, the P-value is used to rank the results, however the F-value may also be used.

In block 210 the groups that have P-values smaller than a threshold (e.g., 0.01) are ranked by the P-values from lowest to highest. ANOVA shows if there is a statistically significant difference among the combinations of process paths. Once it is determined that there is a statistically significant difference among the combinations of process paths, the poor tool and chamber combinations may be determined. If the dependent variable is a yield variable, the lowest yield will determine the poor combination path as shown in block 212. If the dependent variable is parametric data a Cpk index value is calculated. The lowest Cpk index value will determine the poor combination path as shown in block 214.

Cpk index is a type of process capability index used in statistical process control (SPC). As a formula:

$$Cpk = \min\left[\frac{USL - \text{mean}}{3\sigma}, \frac{\text{mean} - LSL}{3\sigma}\right]$$

where mean is an average value of the parametric variable for each process path, USL=an upper specification limit, LSL=a lower specification limit, and σ=a standard deviation of the parametric variable for each process path. The specification limits are given specifications for a wafer that has completed all or a portion of the fabrication sequence.

The results of the analysis are output in block 216. The output may include, for example, a chart that shows which process paths are poor.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for performing fabrication sequence analysis, the method comprising:
    defining a process group, wherein a process group includes fabrication processes in a fabrication sequence;
    determining fabrication process paths in the process group to define independent variables, wherein a process path is a plurality of fabrication equipment used to fabricate a particular semiconductor device in the fabrication sequence;
    receiving a dependent variable for the fabrication sequence;
    performing analysis of variance to calculate a p-value for the process group;
    determining whether the p-value is lower than a threshold value;
    identifying a poor process path responsive to determining that the p-value is lower than a threshold value;
    outputting the identified poor process path;
    determining whether the dependent variable is a parametric value;
    calculating Cpk values, wherein $$Cpk = \min\left[\frac{USL - \text{mean}}{3\sigma}, \frac{\text{mean} - LSL}{3\sigma}\right]$$

and USL is an upper specification limit, LSL is a lower specification limit, mean is an average value of the parametric variable for the process path, and σ is a standard deviation of the parametric variable for the process path; and
    identifying a process path having a lowest Cpk value as the poor process path.

2. The method of claim 1, the method further comprising:
    determining whether the dependent variable is a yield value; and
    identifying a process path having a lowest yield value as the poor process path.

* * * * *